United States Patent
Pintsov (10) Patent No.: US 7,613,660 B2
(45) Date of Patent: Nov. 3, 2009

(54) SYSTEM AND METHOD FOR MAIL DESTINATION ADDRESS INFORMATION ENCODING, PROTECTION AND RECOVERY IN POSTAL PAYMENT

(75) Inventor: Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1246 days.

(21) Appl. No.: 10/456,416

(22) Filed: Jun. 6, 2003

(65) Prior Publication Data

US 2004/0128254 A1 Jul. 1, 2004

Related U.S. Application Data

(60) Provisional application No. 60/436,930, filed on Dec. 30, 2002.

(51) Int. Cl.
*G07B 17/00* (2006.01)
(52) U.S. Cl. .................. 705/60; 705/410; 705/408
(58) Field of Classification Search .............. 705/410; 714/704
See application file for complete search history.

(56) References Cited

U.S. PATENT DOCUMENTS 4,649,541 A * 3/1987 Lahmeyer .................. 714/784
5,835,604 A * 11/1998 Lee ........................... 380/51
6,175,827 B1 * 1/2001 Cordery et al. ............. 705/410
6,209,115 B1 * 3/2001 Truong et al. ............... 714/784

OTHER PUBLICATIONS

X9.92-2002 Public Key Cryptography For The Financial Services Industry. Digital Signature Algorithms Giving Partial Message Recovery. Part 1: Elliptic Curve Pintsov-Vanstone Signatures (ECPVS).

* cited by examiner

*Primary Examiner*—Evens J Augustin
(74) *Attorney, Agent, or Firm*—Michael J. Cummings; Angelo N. Chaclas

(57) ABSTRACT

A process for evidencing postage payment begins by obtaining a destination address for a mail item and encoding it as a string of characters from which a subset of the encoded string is selected, concatenated with plain text data and then encrypted. The encrypted portion is hashed along and a digital signature is computed as part of the digital postage mark. During verification, the mail item is scanned to obtain a digital image thereof, which is parsed to identify and capture the digital postage mark and the destination address block. A recoverable portion of the DAB is extracted and the digital postage mark is parsed into a plain text area and a cryptographic validation code area. The CVC area is parsed to obtain a recoverable portion. If the recoverable portion of the DAB is within a threshold value of the recoverable portion of the CVC, then the mail item is accepted.

3 Claims, 7 Drawing Sheets

SYSTEM AND METHOD FOR MAIL DESTINATION ADDRESS INFORMATION ENCODING, PROTECTION AND RECOVERY IN POSTAL PAYMENT

CROSS REFERENCE TO RELATED APPLICATIONS

This application claims priority under 35 U.S.C. section 119(e) from Provisional Patent Application Ser. No. 60/436,930, filed Dec. 30, 2002, entitled METHOD FOR IMPROVING THE READABILITY OF COMPOSITE IMAGES, which is incorporated herein by reference in its entirety.

FIELD OF THE INVENTION

The invention disclosed herein relates generally to generation and verification of postage evidencing on mail pieces, and more particularly to the generation and verification of a Digital Postage Mark in a postal payment system.

BACKGROUND OF THE INVENTION

Postage metering systems print and account for postage and other unit value printing such as parcel delivery service charges and tax stamps. These systems have been both electronic and mechanical. Some of the varied types of postage metering systems are disclosed, for example, in U.S. Pat. Nos. 3,978,457; 4,301,507; and 4,579,054. More recently, other types of metering systems have been developed which involve different printing systems such as those employing thermal printers, ink jet printers, mechanical printers and other types of printing technologies. Examples of these other types of electronic postage meter are described in U.S. Pat. Nos. 4,168,533; and, 4,493,252. These printing systems enable the postage metering system to print variable information, which may be alphanumeric and graphic type of information.

Card controlled metering systems have also been developed. These systems have employed both magnetic strip type cards and microprocessor-based cards. Examples of card controlled metering systems employing magnetic type cards include U.S. Pat. Nos. 4,222,518; 4,226,360; and, 4,629,871. A microprocessor ("smart card") based card metering system providing an automated transaction system employing microprocessor bearing user cards issued to respective users is disclosed in U.S. Pat. No. 4,900,903. Moreover, systems have also been developed wherein a unit having a non-volatile read/write memory which may consist of an EEPROM is employed. One such system is disclosed in U.S. Pat. Nos. 4,757,532 and 4,907,271.

Postage metering systems have also been developed which employ cryptographically protected information printed on a mail piece. The postage value for a mail piece may be cryptographically protected together with other data to generate a Cryptographic Validation Code (CVC) that is usually included in a Digital Postage Mark (DPM). The Digital Postage Mark, also known as a postal revenue block, is a block of machine-readable (and sometimes also human-readable) information normally present on mail item that provides evidence of paid postage (more precisely evidence of appropriate accounting action by mailer). A CVC is cryptographically protected information that authenticates and enables verification of the integrity of the information imprinted on a mail piece including postage value. Another term sometimes used for CVC is a digital token. Examples of such digital postage metering systems (also referred to herein as digital metering systems) which generate and employ CVC are described in U.S. Pat. Nos. 4,757,537; 4,831,555; 4,775,246; 4,873,645; and 4,725,718; and the system disclosed in the various United States Postal Service published specifications such as Information Based Indicium Program Key Management System Plan, dated Apr. 25, 1997; Information Based Indicia Program (IBIP) Open System Indicium Specification, dated Jul. 23, 1997; Information Based Indicia Program Host System Specification dated Oct. 9, 1996, and Information Based Indicia Program (IBIP) Open System Postal Security Device (PSD) Specification dated Jul. 23, 1997.

These systems, which may utilize a device termed a postage evidencing device (PED), employ a cryptographic algorithm to protect selected data elements using CVC. The information protected by CVC provides security to prevent altering of the printed information in a manner such that any change in the values printed in the postal revenue block is detectable by appropriate verification procedures.

Typical information which may be protected as part of the input to a CVC generating algorithm includes the value of the imprint, the origination zip code, the recipient addressee (destination) information (such as, for example, delivery point destination code), the date and a serial piece count number. These data elements when protected by using CVC which is generated by applying a secret or private key and imprinted on a mail piece provide a very high level of security which enables the detection of any attempted modification of the information in the Digital Postage Mark where this information may be imprinted. Digital metering systems can be utilized with both a dedicated printer, that is, a printer that is securely coupled to an accounting/cryptographic module such that printing cannot take place without accounting, or in systems employing non-dedicated printers and secure accounting system. In the latter case, the digital metering system can be part of a personal computing system, or a wide area or local area network computing system, and the non-dedicated printer may print the CVC as well as other information.

CVCs must be computed and printed, for example, in the DPM for each mail piece. The CVC computation transformation requires a secret or private key, that has to be protected and may be periodically updated. In digital metering systems, the CVCs are usually computed for every mail piece processed. This computation involves taking input data elements such as serial piece count, date, origination postal code and postage amount and encrypting this data with secret keys shared by a digital meter portion of the digital metering system (a.k.a. a postage evidencing device or PED) and postal or courier service and by the postage evidencing device and device manufacturer or vendor. This sharing requires coordination of key updates, key protection and other measures commonly referred to as a key management system. The computation of CVC, which is performed by the digital metering system, takes place upon request to generate a DPM by a mailer. Thus, the digital metering system needs to have all the information required for computation, and, most significantly encryption keys. Moreover, refilling the metering system with additional postage funds also requires separate keys and a management process.

Various enhanced systems have been developed including systems disclosed in U.S. Pat. Nos. 5,454,038; 5,448,641; and 5,625,694, the entire disclosures of which is hereby incorporated by reference.

As noted above, it has been recognized that destination address information can be incorporated into the input to CVC computation. This enables protection of such information from alteration and thus provides enhanced security. The inclusion of destination address information in the digital token insures that for an individual to perpetrate a copying attack by copying a valid DPM from one mail piece on another mail piece and entering it into the mail stream, the fraudulent mail piece must be addressed to the same addressee as the original valid mail piece. The inclusion of destination address information enables automatic detection of unauthorized copies. If this has not been done, the fraudulent mail piece would not be detectable as having an invalid indicia upon verification at a mail processing facility.

It has also been recognized that a level of enhanced security can be obtained by generating the CVC using a subset of destination address information. This concept is disclosed in published European Patent Application Publication No. 0782108 for A METHOD FOR AUTHENTICATING POSTAGE EVIDENCING USING DIGITAL TOKENS GENERATED FROM A SUBSET OF ADDRESSEE INFORMATION, filed Dec. 19, 1996 and published Jul. 2, 1997. The published European application discloses, inter alia, the use of the hash code of a predetermined appropriate section of each address field as an input to CVC computation process. It is suggested that the first 15 characters of each line can be selected as such appropriate section of each address field for authentication. An error correction code is generated for the selected address data using, for example, Reed Solomon or BCH algorithms. A secure hash of this section of the address field data is generated, which is sent to a vault (a.k.a. postal security device) along with the postage required and other data. This information, the section of the address field, is part of a request for a DPM generation. The vault, which may be coupled to a personal computer (PC), generates the CVC using this data. The error correcting code is printed on the mail piece in alphanumeric characters or bar code format. Upon verification, an OCR/mail processing system reads the delivery address from the mail piece and the data from the DPM. Using an OCR or bar code reader, the error correcting code is also read. An error-correction algorithm is executed using the error correcting code. If errors are not correctable, then the recognition process is notified of a failure. If correctable, the appropriate section of each address field is selected for authentication. A secure hash of the selected data is generated during the verification process. A secure hash and the postal data are then sent to the verifier which then generates CVC that is compared to the CVC printed on the mail piece to complete the verification process. The use of error-correction algorithm is motivated by the requirement that all data that needs protection has to be hashed before it can be encrypted using a digital signature algorithm.

An important requirement for digital metering is user-friendliness and low cost. Traditional systems of copy attack detection employ destination address information incorporation into the CVC computation. Such is the IBIP system referenced above. The IBIP system requires the use of 11 digit postal ZIP code as the destination address-identifying element. This has two problems. First, up to 20% of all US postal addresses (for example, apartments in apartment buildings or office buildings) do not have an 11 digit ZIP code. Second, all foreign addresses do not have an 11 digit ZIP code. Third, a database containing 11 digit ZIP codes must be regularly updated since ZIP codes may change for postal addresses. The IBIP specification requires that in order to use digital metering in PC-based system (a.k.a. open systems) mailers must use a certified postal database, which must be updated at least quarterly. These requirements represent significant and in some cases fatal inconvenience to mailers. As a result PC-based digital metering is grossly disadvantaged compared to other methods of postage evidencing. For example, if a mailer is using a full value first class postage and does not provide any postal ZIP code in the destination address, the mailer is still entitled to full spectrum of delivery services from USPS. The important object of present invention is to create a system that would make use of any address information (with or without postal codes) in order to provide protection against copying of DPMs.

Previously known solutions to the problem of DPM duplication fall into two categories. The first category involves printing in the DPM additional (sometimes hidden) information that would be difficult to reproduce using conventional printing means. A good example of this solution is the use of Digital Watermarks, such as disclosed in U.S. patent application Ser. No. 10/077,354 OBJECTS USING DIGITAL WATERMARKS ASSOCIATED WITH MULTIDIMENSIONAL QUALITY METRICS, filed Feb. 15, 2002, and assigned to the assignee of the present application. The disadvantages of Digital Watermarks are twofold. First, Digital Watermarks are still reproducible by dishonest mailers albeit with more difficulty because the cost of reproducing them is higher than simple copying of DPM using a conventional copier. Second, the verification of Digital Watermarks in large quantities requires high resolution specialized scanning equipment. Such equipment is normally not employed by a Post in its mail processing facilities.

The second category of copy protection techniques makes use of the destination address information as a piece of information uniquely indicative of the mail item. As it was noted above, the use of sufficiently deep postal code as an address identifier (such as for example 11 digit ZIP code in USA) is extremely inconvenient for mailers. On the other hand from the verification viewpoint the use of full destination address information is very difficult because this information cannot be recreated during the DPM verification process without at least some errors. It has been discovered that many mail pieces have destination addresses that are difficult and sometimes impossible to fully read, such that the CVC imprinted on the mail piece cannot be verified. These conflicting requirements brought a discovery of Address Identifier (AI) system described in pending patent application E714. It makes use certain additional information (such as a structure of the destination address block) and error correction codes to significantly improve robustness of automatic address reading. This process works but it is not always economical because of the amount of additional information that must be generated and processed including computation of error correction codes for a broad variety of addresses. Another disadvantage of the Address Identifier system is the fact the known error correction codes are not designed to work with text processing system and therefore not optimal. Besides, such Address Identifier still must be robust enough that it can be reproduced without errors even in a relatively error-prone OCR address recognition systems. The Address Identifier is first computed from the address information and then hashed and encrypted (digitally signed) along with other data elements that require protection. The robustness of the Address Identifier can not always be guaranteed and the error recovery process become an essentially manual exercise, slow and costly.

SUMMARY OF THE INVENTION

The present invention enables more efficient mail processing system with enhanced security by enabling verification of cryptographically generated information where necessary data may not be 100% machine-readable, even when the reading is assisted with the use of error correction codes. More particularly, the present invention relates to robust mail piece Digital Postage Mark (DPM) verification systems, increasing the percentage of mail pieces where DPM verification can be achieved, even when destination addressee information may not be able to be recreated error-free, and with enhanced ability to automatically read addressee block information by providing on each mail piece in addition to address block some or all destination address information in other areas of the mail piece. The main improvement of the present patent application lies in the use of a new hybrid digital signature scheme that avoids hashing of at least one portion of the data that has to be digitally signed. This allows a room for error in address recognition process without any sacrifices of the application security.

The approach taken in the present invention avoids all aforementioned issues and difficulties associated with Digital Watermarks and address identifiers. The main idea is to hide (during the mail creation/finishing process) some (significant) portion of the destination address inside the digital signature evidenced in the CVC portion of the Digital Postage Mark. This can be accomplished using digital signature schemes with message recovery. One known example of such a signature is described in ANSI X9.92-2001 Draft Standard "Public Key Cryptography for the Financial Services Industry: PV-Digital signature Scheme Giving partial Message Recovery".

During the DPM verification process the significant portion of the Destination Address can then be retrieved in its original form from the digital signature itself. The retrieved portion of the address then can be compared with the similar portion obtained from the scanned destination address and their proximity to each other can be determined. If they are close, then the DPM is declared authentic and postage is judged paid by the mailer and the mail piece can be processed and delivered with confidence. If, on the other hand, they are not close, the DPM is declared to be a copy or a counterfeit of another DPM and the mail piece can be subjected to further investigation, perhaps using forensic or other means.

The proximity measure (or a distance function) between two portions of the destinations address obtained from two different sources can be for example a Hamming distance or any other suitable proximity measure or distance, from a simple counting of identical characters to a more sophisticated metrics employed in coding theory.

The main advantage of the process of using digital signature schemes with partial message recovery is the fact that it avoids hashing of the recoverable portion of the message and thus avoids the major source of errors associated with the Address Identifier approach. This process is also very economical in the size of the digital signature avoiding any significant increase in the footprint of the DPM. Thus this process is uniquely suited for applications involving DPM copies detection, since it is robust and flexible and does not impose an overhead cost of a large footprint of imprinted data.

Thus it has been discovered that the objective of linking the DPM with the mail piece itself through its destination address can be substantially satisfied, worldwide, for all categories of mail, domestic and international, without employing the United State Postal Service eleven digit destination point delivery code (DPDC) or its equivalents.

In accordance with the present invention, a system and method for destination address encoding for use in a digital postage mark generated by a mailing system begins by obtaining in a control computer a destination address for a mail item. The destination address is sent to a postal security device where it is encoded as a string of characters from which a subset of the encoded string of characters is selected, such that the encoded selected subset is uniquely indicative of the destination address. The selected subset is concatenated with plain text data for a digital postage mark and then encrypted using a cryptographic key in the PSD. The encrypted portion is hashed along with an identity of the mailing system and the plain text data and a digital signature computed including the encrypted portion as part of the digital postage mark. During a verification process for verifying the signature of the digital postage mark, the mail item is scanned to obtain a digital image of the mail item. The digital image of the mail item is parsed to identify and capture a digital postage mark and a destination address block from the mail item. A recoverable portion of the destination address block is extracted and the digital postage mark is parsed into a plain text area and a cryptographic validation code area. The cryptographic validation code area is parsed into a recoverable portion and remaining data. If the recoverable portion of the destination address block is within a threshold value of the recoverable portion of the cryptographic validation code, then the mail item is accepted.

It has also been discovered that the new method does not require access to the regularly updated address databases and works for all mail items, even when the mail items are undeliverable as addressed.

It is another object of the present invention to provide a practical universal system for linking a mail piece identity to a CVC.

BRIEF DESCRIPTION OF THE DRAWINGS

A complete understanding of the present invention may be obtained from the following detailed description of the preferred embodiment thereof, when taken in conjunction with the accompanying drawings, wherein like reference numerals designate similar elements in the various figures, and in which.

DETAILED DESCRIPTION OF THE PREFERRED EMBODIMENT

The main purpose of a DPM is to evidence that postage for a given mail item has been properly paid and securely accounted. Various implementations for DPM have been proposed. In selecting an implementation, it is desirable that the DPM satisfy the following set of requirements:

1) Information printed in the DPM shall be linked with payment or secure accounting.
2) Each DPM shall be unique.
3) Each DPM shall be linked with the mail item for which it provides evidence of payment.
4) A DPM verification process shall be simple and effective, for example, it should be completely automated (except for mail pieces requiring special handling or attention) or a simple manual process that can be performed by mail carriers who handle mail for delivery.

The first requirement is usually satisfied using cryptographic techniques. In its simplest form the link between the payment and the DPM is achieved by printing cryptographically protected information that authenticates the information imprinted on the mail piece (CVC) in the DPM that can be computed only by a device in possession of secret information, for example, a cryptographic key. This key serves as an input to an algorithm producing, for example, a message authentication code (MAC) or a digital signature. Each access to the key results in an accounting action, such as subtraction of the postage from a postage register holding postal money.

The second requirement provides a detection mechanism for unauthorized duplication/copying of the DPM. Printing a unique identification on each mail piece satisfies this requirement.

The third requirement is desirable in order to simplify the detection of reused or duplicate indicia. In particular, it is very desirable to achieve the verification of the DPM without access to external sources of information, such as databases of already used and verified indicia. This requirement considerably simplifies means for satisfying the last requirement. Postage meters meet this requirement either by use of unique information securely linked to accounting means, printers and inks, or by linking information on the mail piece to the DPM.

The system described herein addresses the requirement of the linkage between the mail piece data and the DPM. This linkage has been provided by including data, unique to a mail piece, as an input to a cryptographic transformation, which computes the value of CVC. Of the data present on the mail items, there is one primary candidate of such unique data, namely the destination address. By incorporating the destination address into the CVC along with other relevant information such as date, postage amount and device identification, the postage evidencing device effectively eliminates possibility of reusing once issued (and paid for) DPM information for unpaid mail pieces, with the exception of mail pieces destined to exactly the same address on the same day. This last possibility subjects the attacker to high risk of detection for example by direct examination of mail items by a mailman (since mail pieces are to the same addressee on the same day), with little economic benefit to the attacker. Thus, it is highly desirable to include the destination address into the input to CVC computation and in doing so protect destination address information from undetectable alteration.

Figure 1:
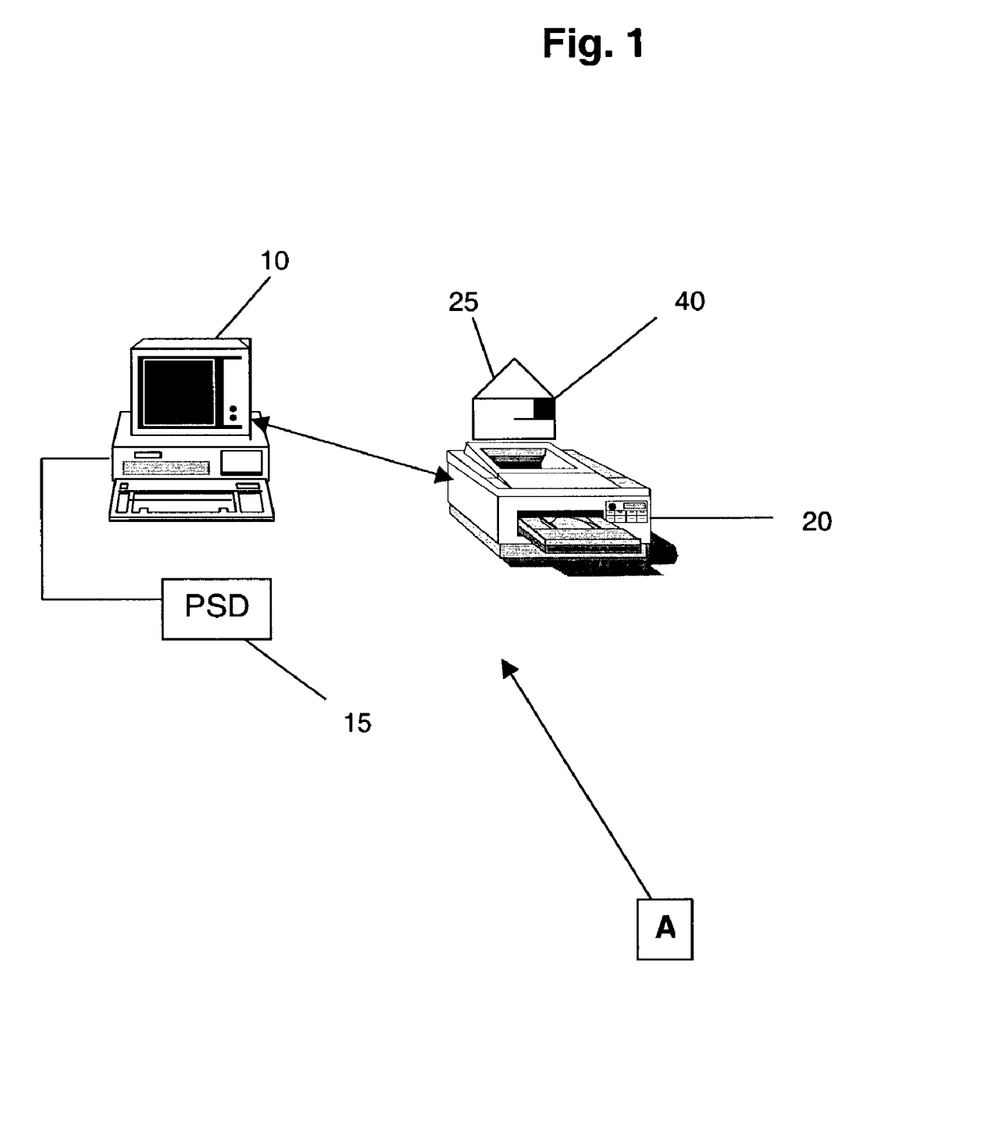
FIG. 1 is a block diagram of a digital postage metering system for creating, and printing mail pieces with DPM which embodies the present invention.
Figure 2:
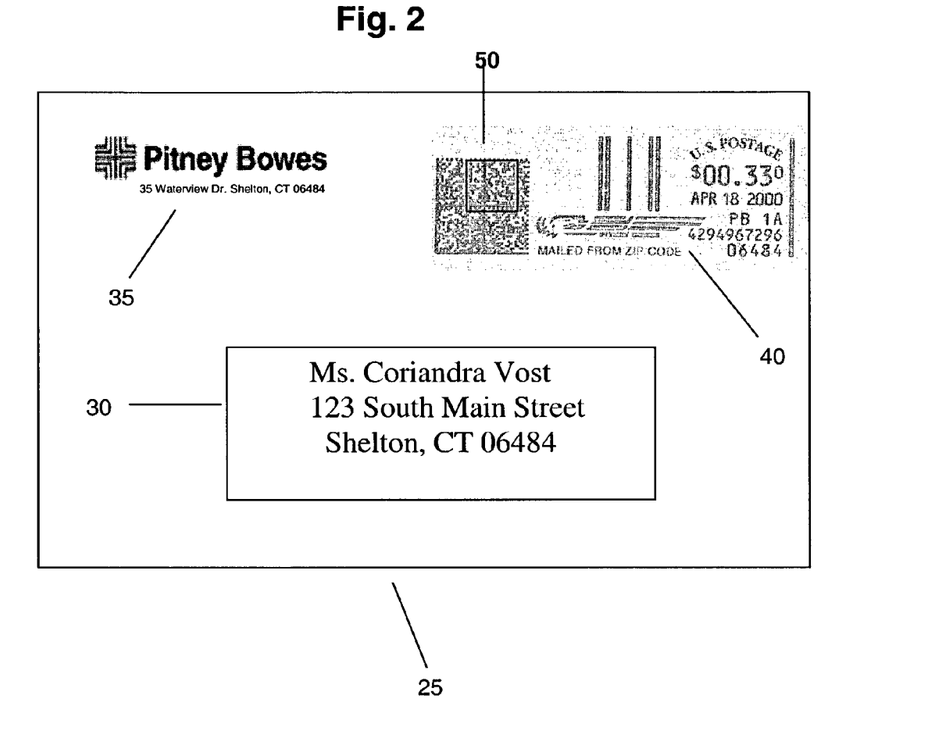
FIG. 2 is a mail piece printed by the system shown in FIG. 1 and includes a part of destination address information hidden in a recoverable from the CVC portion of the DPM printed in a form of a 2D bar code.
Figure 3:
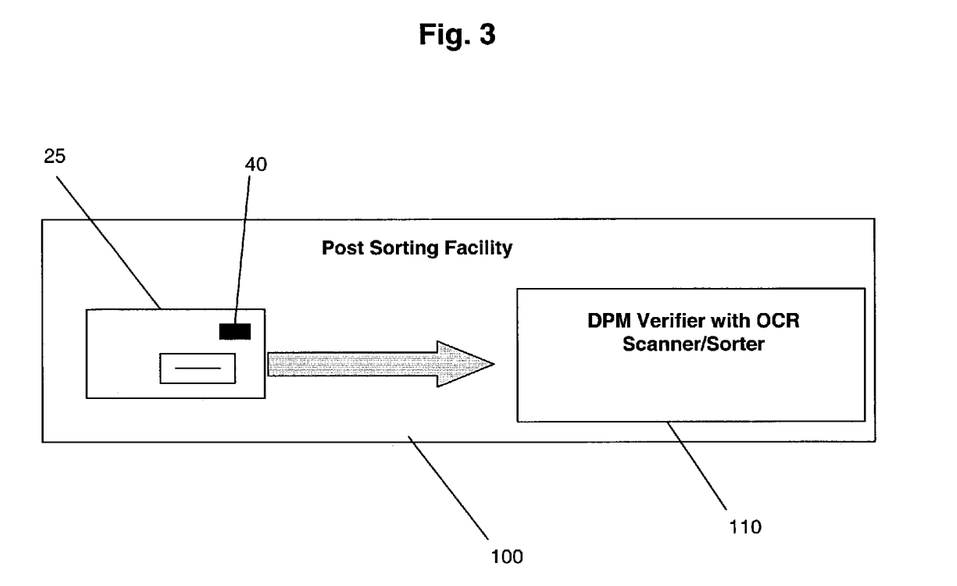
FIG. 3 is a block diagram of a system for verifying mail pieces with DPM which embodies the present invention.

For the purpose of describing the present invention, FIG. 1 shows a representative digital postage metering system A for creating, and printing mail pieces with DPM, which embodies the present invention. The digital postage metering system A includes a host processor 10 having a PSD 15 and a printer 20 coupled thereto to produce a mail item 25 with DPM. FIG. 2 shows a mail item 25 with a destination address block 30, a return address block 35 and a DPM 40, which includes CVC 50. FIG. 3 shows a DPM Verification System 110 at a Post sorting facility 100.

Pintsov-Vanstone Digital Signature Scheme with Partial Message Recovery

A draft of AMERICAN NATIONAL STANDARD ANSI X9.92-2001 PUBLIC KEY CRYPTOGRAPHY FOR THE FINANCIAL SERVICES INDUSTRY: PV-DIGITAL SIGNATURE SCHEME GIVING PARTIAL MESSAGE RECOVERY describes in detail a Pintsov-Vanstone (PV) Digital Signature Scheme with Partial Message Recovery. This signature scheme provides a basic foundation for the present invention.

In the DPM applications all messages (i.e. information) that need to be signed have a fixed short size typically smaller than 160 bits (20 bytes). Under this assumption it has been discovered that the PV-Digital Signature scheme with partial message recovery seems the most appropriate for mailing application. The description below is given for the PV-Digital Signature algorithm using Elliptic Curve Cryptographic scheme. It is noted that other signature algorithms based on the difficulty of solving discrete logarithm problem or any signature algorithms with partial message recovery are equally suitable for the purpose of present invention. This includes, for example, DSA algorithm specified in ANSI X9.30-1 PUBLIC KEY CRYPTOGRAPHY FOR THE FINANCIAL SERVICES INDUSTRY—PART1: DIGITAL SIGNATURE ALGORITHM (DSA). This and other standards referenced in the present patent application are available from American National Standards Institute, ABA, Standards Department, 1120 Connecticut Avenue, N.W. Washington, D.C. 20036.

Plain text that must be signed is designated herein as Postal Data or PD. The plaintext PD is divided into two parts, namely a part C, which represents data elements that in addition to being protected by signature can be recovered during the verification process from the signature itself, and a part V, which contains data elements available in the plaintext within the DPM. This means that $$PD=C\|V,$$

where operation "$\|$" as usual means concatenation.

It must be expressly noted that the integrity of the data elements in V is also protected since V is also signed. This separation of the PD into two parts fits our application almost perfectly. Due to a variety of traditional, marketing, postal accounting, appearance and human readability requirements, some data elements in the DPM and on the mail item itself must be present for immediate visual examination (for example by the recipient). These data elements include destination address, date, postage value and the postal code of location where mail piece was originated. These elements with the exception of the destination address are candidates for the part V. Other data elements such as the value of a serial piece count, the value the ascending register, e-mail address of the sender and/or recipient, telephone or fax number of the sender and the like can form the part C. These data elements allow for a cost effective organization of a number of special postal services such as a proof of deposit and delivery and mail tracking and tracing. However, since V is going to be hashed V can be extended for all desired elements as long as they are present in a plaintext form elsewhere in the DPM or on the mail item. For the purpose of the present invention part C includes critical information about mail item destination address.

The setup for the signature scheme is as follows. Let P be a public point of order n in the group of points of the elliptic curve E (Fq) over the finite field Fq (the total number N of points on the curve is divisible by n). Minimal size for n is approximately 20 bytes (160 bits). Each mailing system designated, for example, A, such as the system shown in FIG. 1, has an identity IA. The identity IA may contain a number of additional parameters and attributes besides strictly identification information for the system, its PSD and a mailer's identity. These parameters depend on application requirements and may include an expiration date, allowed maximum postage value or allowed maximum number of DPMs to be produced by the terminal, an indication of allowed geographical area where mail items produced by the terminal can be deposited, etc. The identity IA is assigned prior to the beginning of operations by the Post or a registration authority such as a vendor trusted by the Post. The identity IA is printed in the PD portion of DPM in plaintext.

It is assumed that the Post either functions as a Certificate Authority (CA) or uses one of the established Certificate Authorities. In its capacity as a CA the Post generates a random integer c between 0 and n. The integer c is the postal system wide private key. The corresponding postal system wide public key is B=cP. The secrecy (confidentiality) of c against cryptanalysis is as usual protected by the difficulty of elliptic curve discrete logarithm problem.

The mailing system A generates a random positive integer kA<n, then it computes the value kAP and sends this value to the Post. It should be noted that this phase could in fact be done using a long-term private/public key pair from a more traditional X.509 certificate key pair. This can be done once for a given period of time or for a given number of authorized DPMs that can be generated by the terminal.

The Post generates a random positive integer $c_A$ smaller than n and the computes the point $\gamma_A$ on the curve $$\gamma_A = k_A P + c_A P,$$

where the value $\gamma_A$ is called an "Optimal Mail Certificate or OMC" in mailing applications.

Next the Post computes a value $$f = H(\gamma_A \| I_A),$$

where H is a hash function. Hash function H could be any suitable hash function, for example SHA-1 described in ANSI X9.30.2-1997 PUBLIC KEY CRYPTOGRAPHY FOR THE FINANCIAL INDUSTRY—PART 2: THE SECURE HASH ALGORITHM (SHA-1) and "∥" as usual denotes the operation of concatenation. At this point various restrictions on the data included in $I_A$ and in the DPM can be tested. The Post then computes its input $m_A$ to the mailer's private key a as follows:

$$m_A = cf + c_A \bmod n$$

and sends values $\gamma_A$, $m_A$ and $I_A$ to the mailer's terminal A. This portion of the protocol is executed once for a period of time prior to mail generation/verification operation. The mailer's terminal A computes its private key a and its public key $Q_A$ as follows:

$$a = m_A + k_A \bmod n = cf + k_A + c_A \bmod n$$

$$Q_A = aP = cfP + \gamma_A = fB + \gamma_A$$

This is also done once for a period of time determined by security and application considerations.

The private key "a" is used by the mailing system to compute the validation code CVC from the plaintext PD using a digital signature with partial message recovery described below. Observe that the private key a is a function of a postal system wide private key "c" and mailer-specific postal private parameter $c_A$ as well as the mailer's private parameter $k_A$.

Note also that the CVC verification key $Q_A$ is a function of only the public parameters and is computable from the OMC $\gamma_A$, postal system wide public key B and the hash value f.

DPM Cryptographic Validation Code Generation Process (Digital Signature Generation Process)

The PV-Digital Signature generation algorithm for the message PD=C∥V begins as usual with the generation of a random positive integer k<n by the mailing system depicted in FIG. 1. The system performs the following computations:

1) R=kP;
2) R is a point on the curve that is formatted as a bit sting for the transformation defined in the step 2;
3) e=$Tr_R$ (C),
   where $Tr_R$ is a bijective transformation parametrized by R and designed to destroy any (algebraic) structure that C might have. Transformation Tr may be a symmetric key encryption algorithm such as DEA or AES or simply the exclusive-or (XOR) operation if C is at most the length of R (in Elliptic Curve Cryptographic Scheme based on the curve over Fq where q=$2^{160}$ R has the length of 160 bits). Secrecy of R is protected as usual by the difficulty of the discrete log problem and a random choice of k. [See AMERICAN NATIONAL STANDARD X9.62-1999: PUBLIC KEY CRYPTOGRAPHY FOR THE FINANCIAL SERVICES INDUSTRY: THE ELLIPTIC CURVE DIGITAL SIGNATURE ALGORITHM (ECDSA)]
4) d=H (e∥$I_A$∥V),
   where H is a hash function and IA is the identity of the mailing system A shown by a way of example in FIG. 1.
5) s=ad+k(mod n),
   where a is the private key of the mailing system A computed as described above.
6) Pair (s, e) is the signature (the validation code CVC) and it is presented for verification in the DPM together with the portion V of the plain text PD and the address block of the mail item.

Note that step 2 is computationally efficient if the size of C is less than or equal to the size of R and the transformation Tr is exclusive-or. For the application of present invention the size of C determines how much of the destination address information can be effectively (with low overhead) hidden inside the signature and it is up to 20 bytes. This means that in the most straightforward character-encoding scheme up to 20 characters of the address information can be recovered from the CVC during verification process.

DPM Verification Process

The DPM verification process begins with the capture of the DPM from a mail piece together with destination address information and parsing the DPM data into the values IA, CVC=(s, e), V and γA. Then a postal verifier performs the following computations:

1) $Q_A$=fB+$\gamma_A$,
   where $Q_A$ is the mailing system public key, computation of which is described above and B is the system wide postal public key; note that B does not need to be known outside of postal verification system.
2) d=H (e∥$I_A$∥V);
3) U=sP−d$Q_A$;
4) X=$Tr^{-1}u$ (d),
   recovering a new value X by the inverse transformation $Tr^{-1}$ parametrized by the value U.
5) Check redundancy of X that is compute a distance between agreed upon elements of the destination address captured form the address block and corresponding elements of X recovered from the CVC and declare C=X and accept the signature as valid if the distance is less than predefined threshold. The process of verification of redundancy and distance computation is described in detail below.

If the plaintext PD (and thus C) is small, then the PD can be "hidden" within the signature in its entirety. The size of C and efficiency of the computation in step 2 of the signature generation process and the size of CVC (because of the "e" portion) are connected. If C is larger than 20-bytes elliptic curve key the efficiency of signature computation can be adversely affected. However, 20 bytes of address data in C provide plenty of protection against existential forgery. Finding two different addresses with identical and carefully selected data elements each comprising 20 characters in such a way that both addresses are desirable targets for mail communication is a very difficult task. In addition, it has been discovered, as it will become apparent from the description of Distance Function in the following section, that the recoverable portion of the destination address can be changed from mail item to mail item or from day to day without adding any complexity to the verification process. This means that even if a dishonest mailer were to discover a computational method of finding two different addresses with identical recoverable portions, the computation to do so would have to be repeated for every mail piece or every day even for repeatable mailings. This would make it prohibitively expensive to utilize such computational method on any commercial scale that can represent even a remote danger to the postal revenue collection integrity. Thus, it is highly unlikely that anybody would spend large computational time and effort to find such pairs of addresses for the purpose of stealing a few dollars worth of postage. However, it also must be expressly noted that the method of present invention allows to increase the size of C to any desirable value and thus to achieve additional security at the expense of computational and space efficiency. Even additional artificial redundancy (beyond natural redundancy present in the structure and content of mailing addresses) can be added to the destination address information if desired. For example, the street range or the postal ZIP code can be repeated twice in the C portion of the PD so that after C has been recovered form the digital signature it would have every digit repeated twice.

In the preferred embodiment of the present invention, as described below, it is assumed that the length of C is 20 bytes, which delivers sufficient protection against any known forgery methods without any adverse effect on both CVC size and computational efficiency of the DPM generation and verification. It is noted that in the future the security requirement for the size of elliptic curve key will force it to increase, thus allowing for corresponding increases in the size of C without any additional penalty. Since the amount of information in postal addresses is not expected to increase, this will provide for additional security without any extra penalty of computational or size inefficiency.

One additional benefit of the present invention is the fact that the recoverable portion of the destination address obtained from the highly machine-readable representation in the DPM also assists in correcting errors that occur during scanning and sorting of mail. Indeed, if, for example, the mail item contains only 5 digit ZIP code (which is normal) and a street range in the DAB is not fully readable by the OCR algorithm employed during mail sorting process, then, under normal conditions, the mail piece will be rejected and out-sorted for an expensive manual sorting or sorting process that utilizes remote video encoding. Even worse if the street range has been read with error(s) (substitution error) then the mail item will be sorted and sent to a wrong destination which would require even more expensive manual recovery process. If the street range is included into the recoverable portion of the destination address information in the OCR read of the street range (reject or substitution errors) can be automatically corrected without resorting to any expensive manual interventions. This and other advantages of the present invention will become apparent from the description in the following section.

Selection of Address Recoverable Portion and Distance Function

The method of present invention provides for a recovery of a pre-specified portion of the mail piece destination address information from the value of the PV-Digital Signature as described in the previous section (see steps 4 and 5 in the section DPM Verification Process above). This pre-specified portion of the destination address is referred to herein as the "recoverable portion". Once the recoverable portion has been obtained by the verification device, such as the DPM Verifier 110 at a Post Sorting facility 100 as shown in FIG. 3, it must be compared with the corresponding portion of the address that has been captured from the mail item' destination address block for example during the course of normal scanning and sorting process by mail processing equipment. This comparison process takes a form of computing the value of a distance function between two portions of the destination address and comparing it with a threshold set up before hand by application security requirements. This section describes various beneficial methods of specifying suitable recoverable portion of destination address and a suitable distance functions.

In the description below, a typical U.S. address is used to illustrate the method of present invention. Addresses in other countries may have a different format than U.S. addresses but they can be formatted into a more or less similar information block suitable for the purpose of present invention.

Referring again to FIG. 2, consider a traditional commonly encountered postal destination address in the U.S. For example, normal representation of the address on a mail item may look like:

Ms. Coriandra Vost
123 South Main Street
Shelton, Conn. 06484

This address from a computational viewpoint can be represented as a string of characters encoded in any suitable computerized coding scheme (for example ASCII):

$$\text{Ms.=Coriandra=Vost} \rightarrow \text{123=South=Main=Street} \rightarrow \text{Shelton=CT=06484,} \quad (1)$$

where the equal sign "=" represents "space" and the arrow sign "→" represents a new line or carriage return symbol. A typical address in the U.S. may have from 2 to 6 lines and contain from 30 to 100 characters.

From a structural viewpoint, different lines in the address have a different meaning and, most important, different levels of redundancy. This means that errors that may occur during OCR reading of the address have different significance for the overall efficiency of the sorting process. The error in a non-redundant element of the address is for the most part fatal (depending on the density of addresses in the computerized Address Data Base employed during OCR reading for error correction purposes). The error in a redundant element of the address on the other hand is correctable because the redundant element is present in a several parts of the address. For example, the 5-digit ZIP code "06484" in the address above is indicative of data in "Shelton Conn." portion of the address.

Therefore if, for example, "06" in "06484" has been read as "@@" (reject, reject) or as "08" or as "58" and "CT" has been read correctly, then all the errors can be corrected automatically since "CT" is uniquely indicative of "06" because all ZIP codes in Connecticut begin with "06". On the other hand, an error in "123" such as "423" may not be recoverable since digit "1" in the street range element "123" has no other presence in the address as written or printed. Thus, it is beneficial both form security and operational viewpoints to include into the recoverable portion of the destination address data elements with the least amount of redundancy.

From a security viewpoint, another important aspect of the address is repeatability of address elements. Repeatable address elements even if non-redundant may provide an easy method of finding two significantly different addresses that would have identical recoverable portion. For example, all standard salutations, such as Mr., Mrs., Ms, President, etc., as well as standard prefixes and nouns such as South, North, West, East, Street, Avenue, Road, Apt., etc., are essentially repeatable for otherwise distinctly different addresses. This suggests, that all standard and common salutations, prefixes and nouns should not be included into the recoverable portion of the address as much as practical. Finally, it is desirable to have a flexible method of selecting recoverable portion of the address, in a sense that the method should be dependant on a changing parameter such as date or other parameter that is random but always known to the verifier. For example, for each day choose different selected recoverable characters. This means that for the same address, different characters may be selected depending on the day of the calendar. That effectively prevents a dishonest mailer from reusing previously found pairs of different addresses with identical recoverable portions. Such addresses are referred to herein as "conflict addresses"

These considerations suggest three requirements for the algorithm of computing (selecting) recoverable portion of the destination address:
1) Select data elements with the least redundancy;
2) Exclude standard data elements commonly present in many addresses; and
3) Change selected elements from mail piece to mail piece or from day to day to prevent multiple use of conflict addresses.

The algorithm for selecting recoverable portion of the destination address is referred to herein as Address Recoverable Portion Selection Algorithm. The scheme for the Address Recoverable Portion Selection Algorithm involves a careful analysis of address databases and creation of the list of standard repeatable nouns and salutations. As used herein, this list is referred to as the List of Standard Words or LSW. The algorithm starts with Destination Address Block formatted as a string of characters for example as shown in the string (1) above and ends with the recoverable portion of the address formatted as the number C suitable for the input to the PV-Digital Signature Generation algorithm.

Figure 5:
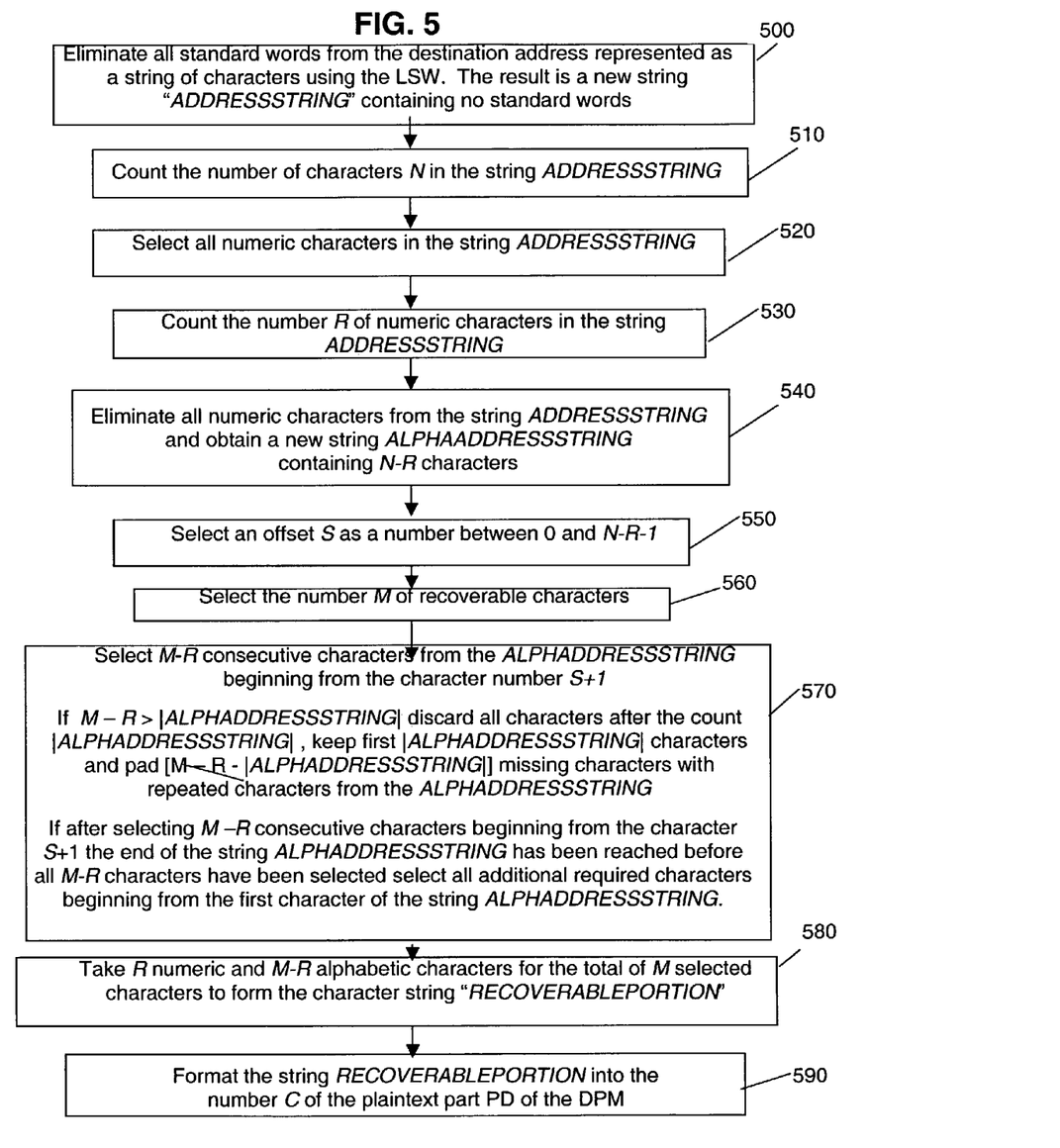
FIG. 5 is a flow chart of the process for computing the recoverable portion of the destination address (Address Recoverable Portion Selection algorithm)

Referring now to FIG. 5, one possible Address Recoverable Portion Selection algorithm that meets the requirements outlined above works as follows. At step 500, eliminate all standard nouns, abbreviations and salutations (collectively referred to as standard words) from the destination address represented as a string of characters (such as the string (1) above) using the LSW; The result is a new string "ADDRESSSTRING" containing no standard words. In eliminating selected characters from a string of characters all space and carriage return characters (denoted by "=" and "→" symbols respectively) are preserved to preserve the structure and composition of the address block. At step 510, count the number of characters N in the string ADDRESSSTRING. At step 520, select all numeric characters in the string ADDRESSSTRING. At step 530, count the number R of numeric characters in the string ADDRESSSTRING. At step 540, eliminate all numeric characters from the string ADDRESSSTRING and obtain a new string ALPHMDDRESSSTRING containing N−R characters. At step 550, select an offset S as a number between 0 and N−R−1. At step 560, select the number M of recoverable characters. In the preferred embodiment M=20 as the optimum trade-off between computational efficiency and security when 20 bytes Elliptic Curve cryptographic key is used for the PV-Digital Signature]. At step 570, select M−R consecutive characters from the ALPHADDRESSSTRING beginning from the character number S+1. If M−R>|ALPHADDRESSSTRING| discard all characters after the count |ALPHADDRESSSTRING|; keep first |ALPHADDRESSSTRING| characters and pad [M−R−|ALPHADDRESSSTRING|] missing characters with repeated characters from the ALPHADDRESSSTRING. If after selecting M−R consecutive characters beginning from the character S+1 the end of the string ALPHADDRESSSTRING has been reached before all M−R characters have been selected select all additional required characters beginning from the first character of the string ALPHADDRESSSTRING. This is a wrap-around process. It is designed to always produce M−R characters regardless of how short is the destination address string ADDRESSSTRING. During this process some characters may be selected twice if the original address is short. At step 580, take R numeric and M−R alphabetic characters for the total of M selected characters to form the character string "RECOVERABLEPORTION". At step 590, format the string RECOVERABLEPORTION into the number C of the plaintext part PD of the DPM (as described in the section DPM Cryptographic Validation Code Generation Process above). The formatting process could be just a simple representation of the string RECOVERABLEPORTION in ASCII code resulting in the number C that would have size of M bytes (one byte per character). The number C then is formatted into a suitable octet format to form a representation of C suitable for computation of PV-Digital Signature as described in full detail in a draft AMERICAN NATIONAL STANDARD ANSI X9.92-2001 PUBLIC KEY CRYPTOGRAPHY FOR THE FINANCIAL SERVICES INDUSTRY: PV-DIGITAL SIGNATURE SCHEME GIVING PARTIAL MESSAGE RECOVERY.

Offset S in the step 550 of the algorithm can be a fixed or a variable function of pre-selected parameters such as date and time of mailing or the value of the ascending register of the PSD. In order to meet the third requirement for the algorithm of computing (selecting) a recoverable portion of the destination address outlined above the offset S should not be fixed. Many beneficial schemes for selecting S are possible. For example, in many applications the DPM includes in the plain text protected from alteration by the CVC either the value of the serial piece count (referred to below as the PieceCount) or the value of the ascending register (AscendingRegister) to provide freshness for every newly printed DPM. Either one of these parameters can be used in computing S, for example:

$S=[\text{PieceCount}] \bmod [N-R]$ or $S=[\text{AscendingRegister}] \bmod [N-R]$, where operation [X] mod [N−R] as usual represent s a remainder of division of a value X by the value of integer N−R in order to bring the resulting number into the desired range between 0 and N−R−1.

Similarly if the Date or Time stamp is important for verification purposes they can be used too, for example by formatting Date into a standard number Date=DDMMYYYY using any suitable formatting scheme and then computing S as follows:

$S=$ Date mod $[N-R]$.

Finally, if it is desirable that both the date and piece/count or ascending register to participate in computation of the offset S, then a suitable combination can be used, for example:

$S=$[AscendingRegister+Date] mod $[N-R]$.

It should be expressly noted that many other algorithms for computing Address Recoverable Portion Selection of the destination address and achieving beneficial properties for the offset S are possible and entirely within the scope and spirit of the present invention.

An example of computing RECOVERABLEPORTION for the address string (1) above that is to be used for mail item with the serial number (piece count) 375 is as follows:
1. Input address string:
    Ms.=Coriandra=Vost→123=South=Main=Street→Shelton=CT=06484:
2. Eliminate all standard names and salutations from the destination address represented as string of characters using the LSW.
    The result is a new string "ADDRESSSTRING":
    ADDRESSSTRING:
    Coriandra=Vost→123=Main→Shelton=CT=06484:
3. Count the number of characters N in the string ADDRESSSTRING:
    |ADDRESSSTRING|=N=40
4. Select all numeric characters in the string ADDRESSSTRING:
    12306484
5. Count the number R of numeric characters in the string ADDRESSSTRING: R=8
6. Eliminate all numeric characters from the string ADDRESSSTRING and obtain a new string ALPHMDDRESSSTRING containing N−R characters: ALPHMDDRESSSTRING
    Coriandra=Vost→=Main→Shelton=CT=
7. Select an offset S as a number between 0 and N−R−1:
    PieceCount=375; S=PieceCount mod 32=23
8. Select the number M of recoverable characters:
    M=20; (a 20-bytes key is used for PV-Signature which delivers optimum computational efficiency and security trade-off)
9. Select M−R consecutive characters from ALPHMDDRESSSTRING beginning from character number S+1:
    M−R=20−8=12; S+1=23+1=24;
    ALPHAADDRESSSTRING=Coriandra=Vost→=Main→Shelton=CT=Character h is the character number 24; The M−R=12 selected characters are as follows:

helton=CT=Co

10. Take R numeric and M−R selected alphabetic characters for the total of M characters to form a string "RECOVERABLEPORTION":
    RECOVERABLEPORTION=12306484helton=CT=Co The string 12306484helton=CT=Co is formatted using standard ASCII encoding to form a binary string that in turn is formatted into octet-based representation to form a representation of C suitable for computation of PV-Digital signature as described in detail in a draft AMERICAN NATIONAL STANDARD ANSI X9.92-2001 PUBLIC KEY CRYPTOGRAPHY FOR THE FINANCIAL SERVICES INDUSTRY: PV-DIGITAL SIGNATURE SCHEME GIVING PARTIAL MESSAGE RECOVERY.

During the DPM verification process the recoverable portion of the destination address is obtained twice. First copy of the recoverable portion is obtained from DAB (Destination Address Block) as the mail item being read and sorted and then a second copy is obtained from the DPM (more precisely from the CVC) during the DPM verification process. The first copy of recoverable portion is referred to herein as DABRECOVERABLEPORTION and the second copy as CVCRECOVERABLEPORTION.

The DABRECOVERABLEPORTION and the CVCRECOVERABLEPORTION may differ as a result of errors that are inevitable during the OCR address recognition process. Typically, the mail items that are subject to the application of the present invention have machine-printed destination addresses. For such addresses modern OCR reading algorithm normally deliver from 95 to 97% error-free recognition rate on character per character bases. This means that for the 20-character long string DABRECOVERABLEPORTION there will be on average 1 error. This may be a substitution or rejection error. Modern OCR algorithms also can be tuned to almost entirely eliminate substitution errors at the expense of increasing the number of rejection errors. This is not very important for our applications. Whatever the nature of errors it can be safely assumed that the error rate standard deviation (for normally distributed errors) will result typically in no more than 3 errors. This means that with the 95% confidence level it can be assumed that 99% of mail pieces will not have more than 3 OCR errors in DABRECOVERABLEPORTION. This effectively determines critical threshold value for our distance function as will become apparent below.

There are also non-OCR type errors that are normally present during address recognition process. These errors are associated with the address block finding, address parsing into lines and words and words' segmentation into individual characters. If the address could not be found or parsed the mail piece is normally rejected for manual processing. In this case DABRECOVERABLEPORTION and CVCRECOVERABLEPORTION can be processed off-line using hand-held scanners and specialized forensic software and manual key entry procedures. The segmentation errors typically occur when space character in the address block is missed or a wide character such as "m" is mistaken for two characters, for example "i" and "n". These types of errors are compensated in the distance function computation algorithm. Typically the segmentation error would result in the total mismatch, meaning that the number of positions where characters from DABRECOVERABLEPORTION and CVCRECOVERABLEPORTION would differ would be close to the total size of the RECOVERABLEPORTION, i.e. M=20.

Due to the highly redundant and machine-readable-by-design nature of the DPM data representation (i.e. specialized 2D barcode), the CVCRECOVERABLEPORTION string will be retrieved during verification process from the CVC portion of the DPM without errors. The distance function algorithm should compute a function "d" of the two values DABRECOVERABLEPORTION and CVCRECOVERABLEPORTION:

d (DABRECOVERABLEPORTION, CVCRECOVERABLEPORTION)

and compared it with a pre-determined threshold value. There are many possible candidates for the distance function d. In the preferred embodiment a simple counting of positions where DABRECOVERABLEPORTION and CVCRECOVERABLEPORTION have different characters is sufficient. It should be expressly noted that any other suitable functions are entirely within the scope and spirit of the present invention.

The threshold value should define when mail items should be rejected due to the suspicion of deliberate counterfeiting (fraud) on the part of the mailer. The threshold value is referred to herein as "threshvalue". The threshold value can be fixed or can be made a function of other parameters, for example it can be made a function of the postage value in the DPM and the nature of mailer. Typically, certain types of mailers are more prone to cheating than others. For example presort houses or letter shops are more frequently proven to be engaged in postage stealing schemes that other types of mailers. The nature of the mailer can be determined from the mail item using the origination (or return) address when available. It is certainly make sense to use somewhat smaller value of the threshvalue for high postage items such as parcel or express mail items. Thus, it is assumed that, $$thresvalue=thresvalue\ (postage, mailer).$$

It should be expressly noted that other application-dependent definition of threshold value are within the scope and spirit of the present invention. It is also assumed that the segmentation threshold value that is indicative of possible segmentation error (when almost all characters in DABRECOVERABLEPORTION and CVCRECOVERABLEPORTION are different) is close to M. The segmentation threshold value is denoted below as "segmthreshvalue". In practice, the segmthreshvalue is close to the value of M, i.e.

$$segmthreshvalue=M-\epsilon,$$

where $\epsilon=1$, 2 or 3 depending on the OCR recognition algorithm and security requirements.

Figure 7:
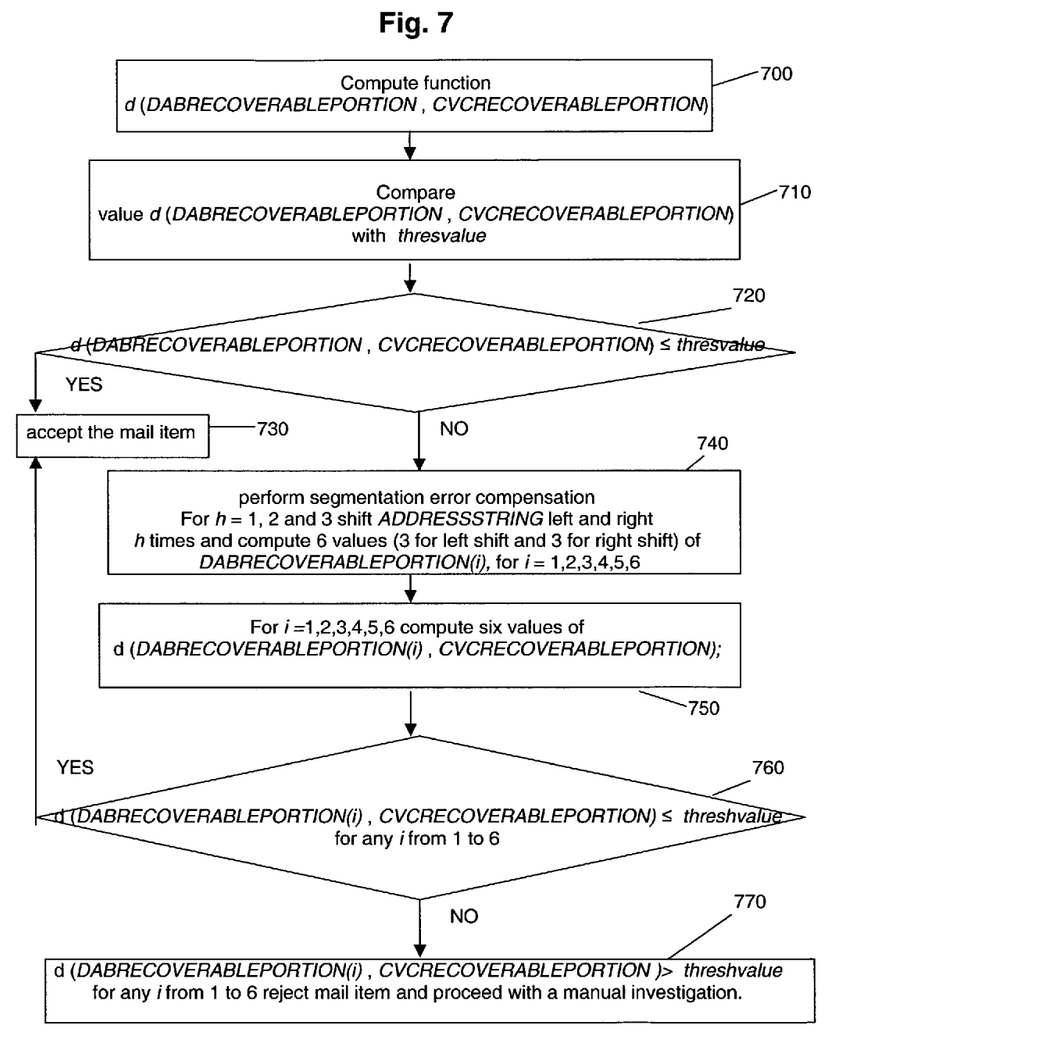
FIG. 7 is a flow chart of the Distance Function Computation.

Referring now to FIG. 7, the last steps of the DPM verification process work as follows. At step 700, compute the function:

$$d\ (DABRECOVERABLEPORTION, CVCRECOVERABLEPORTION);$$

At step 710, compare:

value d (DABRECOVERABLEPORTION, CVCRECOVERABLEPORTION) with thresvalue.

If, at step 720, $$d\ (DABRECOVERABLEPORTION, CVCRECOVERABLEPORTION)<thresvalue,$$

then, at step 730, accept the mail item. If, at step 720, $$d\ (DABRECOVERABLEPORTION, CVCRECOVERABLEPORTION)>segmthresvalue,$$

then, at step 740, perform the following segmentation error compensation. For h=1, 2 and 3 shift ADDRESSSTRING left and right h times and compute 6 values (3 for left shift and 3 for right shift) of DABRECOVERABLEPORTION(i), for i=1,2,3,4,5,6. At step 750, for i=1,2,3,4,5,6 compute six values of $$d\ (DABRECOVERABLEPORTION(i), CVCRECOVERABLEPORTION).$$

At step 760, check if $$d\ (DABRECOVERABLEPORTION(i), CVCRECOVERABLEPORTION)<threshvalue$$

for any i from 1 to 6 and, at step 730, accept the mail item if this condition is true. If, at step 760, for any i from 1 to 6

$$d\ (DABRECOVERABLEPORTION(i), CVCRECOVERABLEPORTION)>threshvalue,$$

then at step 770, reject mail item and proceed with a manual investigation.

For the purposes of the present invention and because of the considerations of OCR error rates outlined above the normal value for the thresvalue should be 2 or 3 depending on security requirements. For high postage value items or mail items originating from suspicious mailers the thresvalue can be reduced to 1.

The special case of segmentation errors can be handled as described above. Namely, if the distance function value d is (significantly) above the threshvalue, then all characters in the string ADRESSSTRING can be shifted left and right for one, two or three positions and for each shift the DABRECOVERABLEPORTION is computed and compared with the string CVCRECOVERABLEPORTION. If a good match (d<thresvalue) is found the mail item can be accepted thus attributing originally occurred mismatch to a segmentation error. This procedure may significantly improve the overall robustness of the verification process and the number of false alarms when a genuinely paid mail item could be mistakenly rejected as a fraudulent one.

Mail Item Generation Process

It is assumed that in the preferred embodiment for the present invention mailer does not normally have access to the finest postal code completely identifying the intended recipient's mailbox. This means that most mailers normally do not have 9 or 11 digit Postal (ZIP) code for all addresses in their computerized address databases. In fact it is assumed that mailers do not have any postal code for some addresses, for example when mail item is intended for a foreign destination. It is also assumed that mailers prefer not to create and print any extra information on the envelope (such as PostNet linear bar code) beyond and above what is minimally required for the accurate delivery. These are the mailers that are not allowed to claim any postage discount due to low volume of their mailings. All these conditions and requirements are assumed having in mind user-friendliness and convenience of the mail creation process for mailers. It is also assumed that mailer uses a computer-driven print system capable of printing at least DPM and sometimes Destination Address Block (DAB) in any desired location on the mail item. This could be accomplished by an envelope or a label printer. It should be expressly noted that the system of present invention could be also adapted for use with the so-called Business or Courtesy Reply Envelopes. These are the envelopes that mailer receives from other mailers that are included by the sender for the convenience of the recipient. In this case the destination address information is already pre-printed either on the envelope (Business Reply Envelope) or on an insert visible through the window of a Business Courtesy Envelope. In either case, the mailer who wants to use Business or Courtesy Reply Envelope must enter the destination address information form these envelopes into his/her mailing system or retrieve such previously entered information from an address database for example for frequently used destinations. It is assumed that the mailer also has access to a Postal Security Device (PSD) that can be either a part of his/her mailing system or located at a remote server site accessible from the mailing system. The PSD is designed to perform all secure cryptographic computations described in the previous sections.

It is assumed that the PSD is operatively connected to a control computer equipped with data entry or communications means and capable of driving printing means. This is referred to herein as a control computer. It should be expressly noted that the control computer can be any suitable computer such as a PC, a palm pilot or a computer normally employed in postage meters to control all its processing functions.

Figure 4:
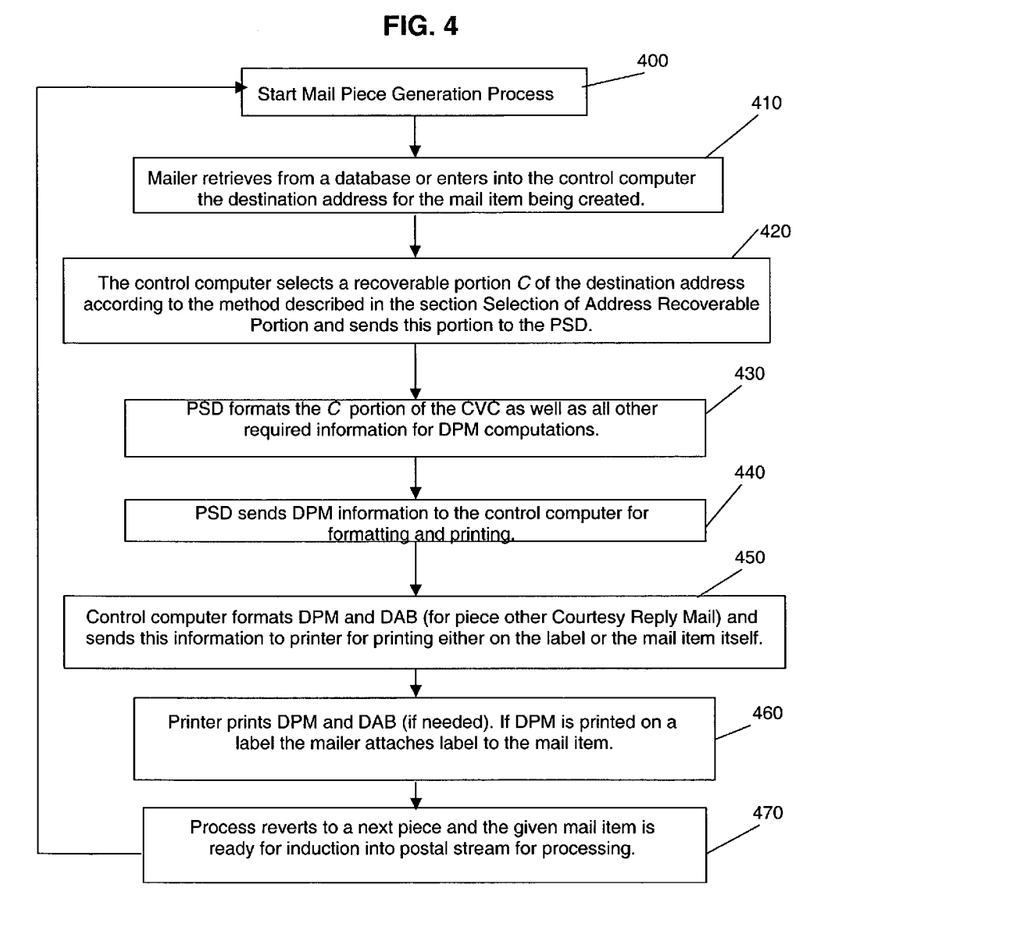
FIG. 4 is a flow chart of the mail piece generation process employing the present invention.

Referring now to FIG. 4, the mail item creation process works begins at step 400. At step 410, the mailer retrieves from a database or enters into the control computer the destination address for the mail item being created. At step 420, the control computer selects a recoverable portion of the destination address according to one of the methods described above and sends this portion to the PSD. At step 430, the PSD formats the C portion of the CVC according to the routine described above as well as all other required information for the DPM computations. At step 440, the PSD sends the DPM information to the control computer for formatting and printing. At step 450, the Control computer formats the DPM (for example in DataMatrix bar code) and the DAB (for piece other Courtesy Reply Mail) and sends this information to the printer for printing either on a label or the mail item itself. At step 460, the printer prints the DPM and DAB (if needed). If the DPM is printed on a label, the mailer attaches the label to the mail item. At step 470, the process reverts to a next mail item and the given mail item is ready for induction into postal stream for processing.

Mail Item Verification Process

Figure 6:
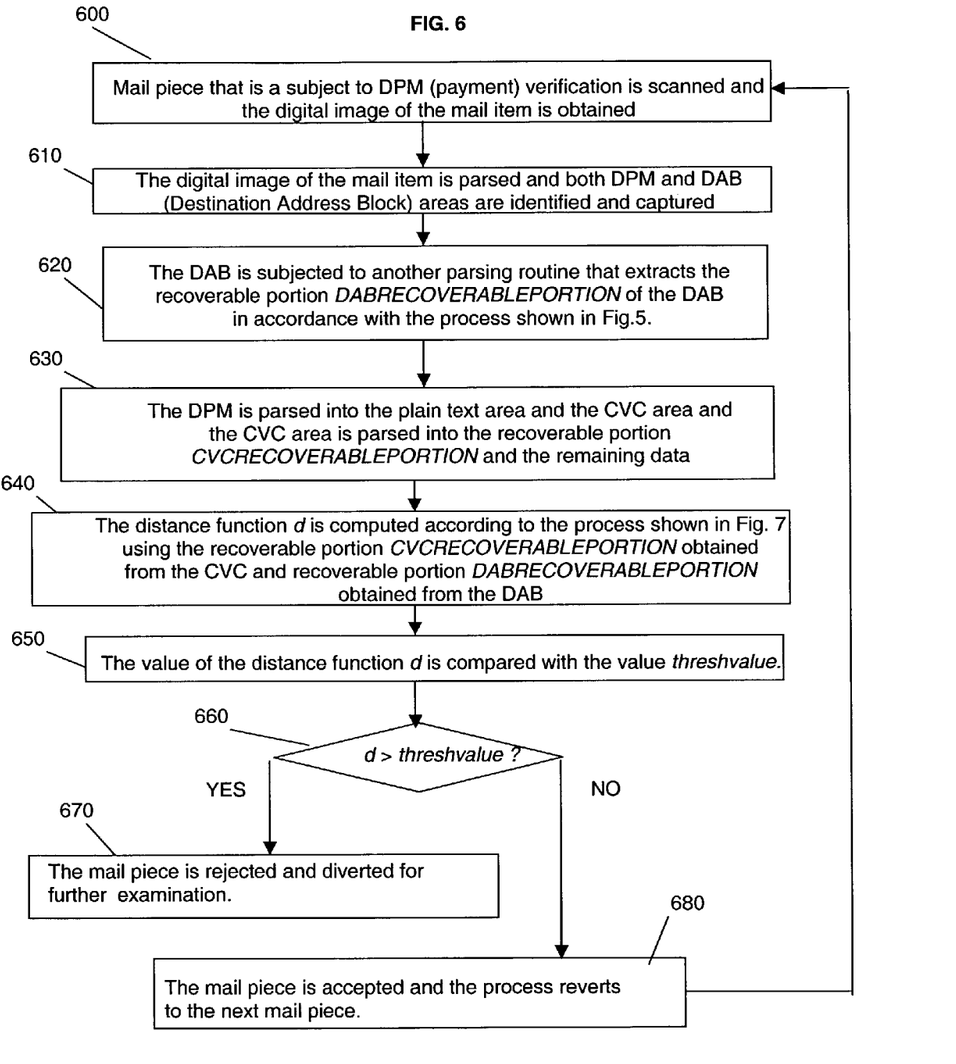
FIG. 6 is a flow chart of the verification process of the mail piece created in accordance with the process shown on FIG. 2.

It is assumed for the purpose of the present invention that the DPM is physically represented on the mail item in an identifiable location in a suitable machine-readable format. For example, DPM is customary printed in the form of 2-dimensional bar code such as DataMatrix (FIG. 2). Referring now to FIG. 6, the mail verification process is as follows. At step 600, a mail piece that is a subject to DPM (payment) verification is scanned and the digital image of the mail item is obtained. At step 610, the digital image of the mail item is parsed and both the DPM and DAB areas are identified and captured. At step 620, the DAB is subjected to another parsing routine that extracts the recoverable portion DABRECOVERABLEPORTION of the DAB in accordance with the process shown in FIG. 5 and described in the above section "Selection of Address Recoverable Portion and Distance Function". At step 630, the DPM is parsed into the plain text area and the CVC area, and the CVC area is parsed into the recoverable portion CVCRECOVERABLEPORTION and the remaining data. At step 640, the distance function d is computed according to the process shown in FIG. 7 and described in the above section "Selection of Address Recoverable Portion and Distance Function" using the recoverable portion CVCRECOVERABLEPORTION obtained from the CVC and recoverable portion DABRECOVERABLEPORTION obtained from the DAB. At step 650, the value of the distance function d is compared with the value threshvalue. At step 660, a check is made to determine if the threshvalue is >d. If d>threshvalue, then at step 670, the mail piece is rejected and diverted for further, possibly forensic examination. If d≦threshvalue, then at step 680, the mail piece is accepted and the process reverts to the next mail piece.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of digital postage mark generation for a mail item, the method comprising the steps of:
   obtaining a destination address for a mail item;
   computing a recoverable portion C of the destination address;
   formatting the recoverable portion C in a cryptographic validation code along with other information of a digital postage mark;
   sending the digital postage mark to a control computer for formatting and printing;
   wherein the step of computing the recoverable portion of the destination address includes the steps of:
   formatting the destination address as an address string of characters;
   eliminating predetermined words and characters from the address string to form a first string ADDRESSSTRING;
   counting a number of characters N in ADDRESSSTRING and a number of numeric characters R in ADDRESSSTRING;
   eliminating all numeric characters from ADDRESSSTRING to obtain a second string ALPHAADDRESSSTRING containing N–R characters;
   selecting an offset S as a number between 0 and N–R–1, and a number M of recoverable characters;
   selecting M–R consecutive characters from ALPHAADDRESSSTRING beginning from the character S+1;
   forming a third string RECOVERABLEPORTION by taking R numeric and M–R alphabetic characters for a total of M selected characters; and
   formatting RECOVERABLEPORTION into the number C of the plaintext part of postal data of the digital postage mark.

2. The method of claim 1 wherein the step of forming RECOVERABLEPORTION includes the steps of:
   discarding all characters after the count |ALPHAADDRESSSTRING| if M–R>|ALPHAADDRESSSTRING|; and
   keeping first |ALPHAADDRESSSTRING| characters and pad [M–R–|ALPHAADDRESSSTRING|] missing characters with repeated characters from the ALPHAADDRESSSTRING.

3. The method of claim 2 wherein the step of forming RECOVERABLEPORTION includes the further steps of:
   selecting all additional required characters beginning from a first character of ALPHAADDRESSSTRING if after selecting M–R consecutive characters beginning from the S+1 character the end of ALPHADDRESSSTRING is reached before all M–R characters have been selected.

* * * * *

UNITED STATES PATENT AND TRADEMARK OFFICE
CERTIFICATE OF CORRECTION

PATENT NO. : 7,613,660 B2
APPLICATION NO. : 10/456416
DATED : November 3, 2009
INVENTOR(S) : Leon A. Pintsov Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1915 days.

Signed and Sealed this

Nineteenth Day of October, 2010

David J. Kappos
*Director of the United States Patent and Trademark Office*